FERRIELECTRIC DEVICES

Filed Nov. 21, 1962 4 Sheets-Sheet 1

INVENTOR.
CHARLES F. PULVARI
BY
Browne, Schuyler, & Beveridge
ATTORNEYS.

INVENTOR.
CHARLES F. PULVARI
BY
Browne, Schuyler & Beveridge
ATTORNEYS.

INVENTOR.
CHARLES F. PULVARI
BY
Browne, Schuyler, & Beveridge
ATTORNEYS.

INVENTOR.
CHARLES F. PULVARI
BY
Browne, Schuyler, & Beveridge
ATTORNEYS.

United States Patent Office 3,476,951
Patented Nov. 4, 1969

3,476,951
FERRIELECTRIC DEVICES

Charles F. Pulvari, 2014 Taylor St. NE., Washington, D.C. 20018

Filed Nov. 21, 1962, Ser. No. 239,180
Int. Cl. H03k 3/49
U.S. Cl. 307—88 29 Claims

ABSTRACT OF THE DISCLOSURE

Ferrielectric devices and circuits employing stable ferrielectric materials exhibiting a threshold switching field as distinguished from ordinary ferroelectric materials which do not have a threshold switching field. Stable devices and circuits utilizing same incorporating polarization switchable dielectric materials having layered-type structure of the mixed bismuth oxide type modified by selected impurity additions. Earlier application Ser. No. 14,585, disclosed first class of such polarization switchable materials and devices having a threshold switching field. The present application relates to a class of materials identified as "mixed bismuth oxides with layer-type structure." United having internal bias of one type are coupled to units having opposite or complementary internal bias characteristics. Consult specification for details and other features of the invention.

Figure 1A:
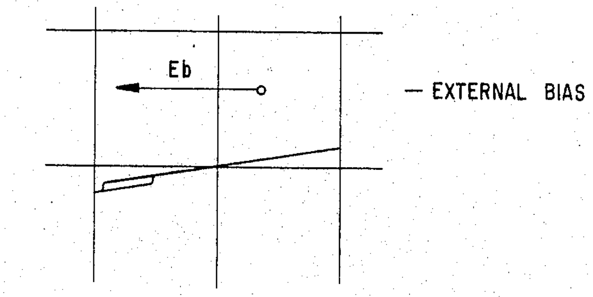
Figure 1B:
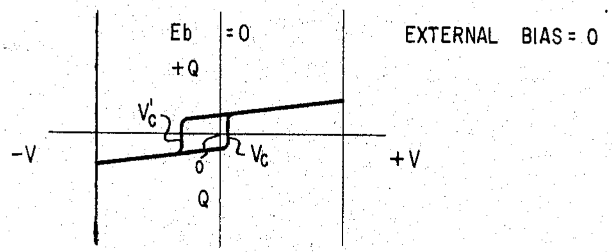
Figure 1C:
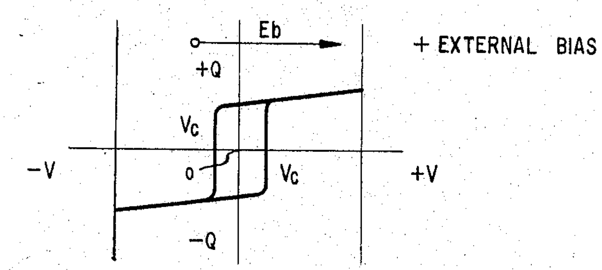
Figure 1D:
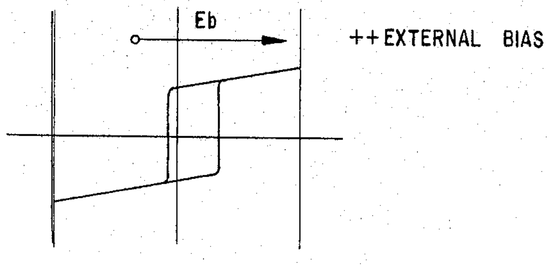
Figure 1E:
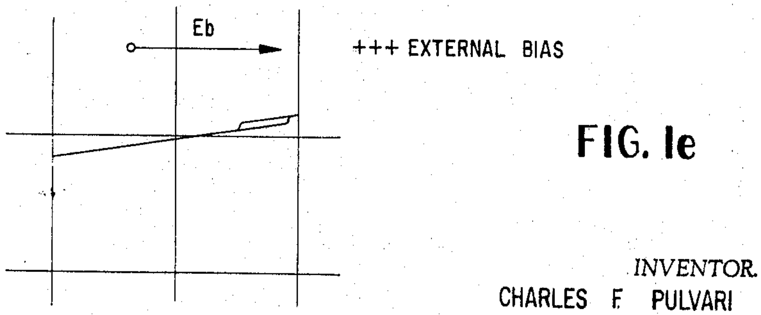

This invention relates in general to ferrielectric devices, methods for fabricating same and electrical circuits incorporating ferrielectric material. In particular, the invention relates to improved ferrielectric materials, and structures incorporating same.

As disclosed in my application Ser. No. 14,585, filed Mar. 14, 1960, now Patent No. 3,365,400, ferrielectrics are essentially degenerate anti-ferroelectric materials, i.e., in which the free energy of the anti-ferroelectric state was modified within a wide temperature region by a proper choice of substitutions or impurity addition resulting in materials which, in many respects, are analogous to ferrimagnetic materials.

Electrical hysteresis loop measurements lead to the clear recognition that, in the stably induced ferrielectric phase, the anti-ferroelectric and ferroelectric phases coexist. This fact manifests itself by the multiple peaks in the dielectric vs. time [$\epsilon=f(t)$] plot, and the hysteresis loops which are seemingly identical in appearance to ordinary ferroelectric loops but are in fact degenerate anti-ferroelectric loops.

The switching current transients of ordinary ferroelectrics exhibit a single peak, while ferrielectrics exhibit multiple peak, current transients not observed in ordinary ferroelectrics and are explained by the degeneracy of the antiferroelectric state. The time difference between peaks is characteristics of the existence of an internal bias field $E_b$, which is indicative of the degree of degeneracy of the anti-ferroelectric state. The internal bias field $E_b$ may be symmetrical or asymmetrical, for example in the Niobate type ferrielectric disclosed in my application Ser. No. 14,585, the internal bias is symmetrical and symmetrical hysteresis loops are observed, while in the class of ferrielectrics designated by the general term "mixed bismuth oxides with a layer type structure," the hysteresis loops are found to be asymmetrically biased. As low switching fields, the peaks usually appear time separated; as the switching field is increased these double peaks appear closer and closer until they merge into a fine structure, where the identity of the double peaks nearly disappears. Also, in contrast with ordinary ferroelectrics, the coercivity $E_c$ decreases as the applied field is increased.

The explanation of this phenomena is also in the degeneracy of the anti-ferroelectric state. As the bias field decreases with increasing field, the coercivity of the degenerate loop ($V_c^a=V_b+V_c$) also decreases.

In ferrielectrics usually the opening of a hysteresis loop requires a higher field than the coercive field measured on the hysteresis loop, and a coercive force representing a true threshold field exists. The switching transients do not appear continuously with increasing field as is the case with ordinary ferroelectrics, but appear rather abruptly beyond a certain threshold field. An explanation for this phenomena is offered in the existence of a strong transverse dipole-dipole interaction and, as a consequence, a thick domain wall which, with the imperfections introduced in the lattice, leads to the experimentally found threshold field similar to those observed in ferrites. Recent research in ferrielectrics shows that, in contrast with ordinary ferroelectrics, a number of unusual phenomena exist and the crystal structure must satisfy special requirements. A brief summary of the more important and heretofore not observed phenomena and requirements follow:

(1) Employing proper substitutions in an antiferroelectric, the ferrielectric state may either be genuinely produced, or it may be stably induced by the application of a polarization field in a particular heretofore antiferroelectric direction.

(2) A degenerate antiferroelectric state must exist, i.e., antiferroelectricity and ferroelectricity must coexist.

(3) The crystal antidipole structure must be so related that it should offer an uncompensated antipolarization, implying a noncolinear polarization pattern. As an illustration, consider an orthorhombic type transition in a crystal during switching with a herringbone like polarization pattern.

(4) As a consequence of 2 and 3, the dipole pattern, determined by the detailed structure of the crystal, causes a stable symmetric or asymmetric internal bias field. This represents a stable bias depending on the crystal structure only and is not altered by repeated heating or switching cycles below the Curie temperature $T_c$.

(5) Most importantly, because of 2, 3 and 4, a switching threshold field exists.

(6) Finally, it is noted that the type ferrielectric with colinear polarization vectors has, in its pure form, not yet been observed except if one considers the modified potential barriers around loci of impurities. That is, substitutions which cause a load distortion of the lattice and elevate or depress the potential barriers in a particular region causing, in these regions, a cluster of large or smaller dipoles. This situation may well represent, at least in part, the presence of this case, and may be responsible for enhancement of the transition from the anti-ferroelectric to the ferrielectric state (see ASD–TDR 62–636, sec. III, B, 1, a).

The first material of this new group exhibiting ferrielectric properties was disclosed in my U.S. patent application Ser. No. 14,585 and was sodium niobate vanadate $N(Nb_{1-x}V_x)O_3$.

Recently, exact measurements have been developed for the determination of the threshold switching fields in ferrielectrics and, with the facts briefly summarized, I conducted further intensive research to find new materials exhibiting ferrielectric properties. It was visualized that there is a good possibility of finding ferrielectric properties in the "Mixed bismuth oxides with layer-type structure" because in 1949 Bengt Aurivillius in Sweden, reported in the Arckiv for Kemi Bank 1 No. 58, a crystal structure of the simplest mixed bismuth oxides having the formula $Bi_4Ti_3O_{12}$ as being orthorhombic within the temperature region of interest, and the crystalline plates exhibited in a cross polarized light a symmetric extinction.

On grown crystals, it was established by the application of a sufficiently large field, that this material exhibited double hysteresis loops indicating the anti-ferroelectric nature of the structure never heretofore reported by others. If, however, a lower field is applied, a biased hysteresis loop is obtained whose internal bias field was found to be very stable and does not vary with the applied field, temperature, or repetition rate within a wide region of these parameters. Ordinary biased ferroelectric materials were defined as exhibiting hysteresis loops which are unsymmetrical with respect to one or both of the normal coordinate axes (E=O, D=O) but which are symmetrical with respect to a second set of axes. The coordinates of the origin of this second set of axes, with respect to the first, define the bias. It was found, however, that the biased loops of the mixed bismuth oxides are not symmetrical with a second set of axes. Furthermore, an externally applied D.C. bias altered the relative position of the loop observed on an oscilloscope. As a consequence, these biased loops appear to be a special type of degenerate anti-ferroelectrics.

This was confirmed when double peaks were found in the differentiated hysteresis loop ($\epsilon$-$t$ plot) and by the anti-ferroelectric double loops found at high field strength. Furthermore, I established by a large number of accurate threshold field measurements that this material exhibits a definite and clearly repeatable threshold switching field. This finding established this material as being a ferrielectric. In addition to the threshold switching field, I also found highly useful electrical and technological properties as follows:

(1) Very thin plates can be obtained so that switching voltages as low as 5 to 10 volts are obtainable.

(2) The breakdown voltage of this material seems to be very high. It appears to be at least as high as one million volts per centimeter, which rangs with the breakdown of mica.

(3) In some samples, saturation voltages of about 600 volts R.M.S. were found which were 60 times the coercive voltage $V_c$. This is, of course, a most valuable industrial property.

(4) Threshold voltages of about 5 volts have been observed in a sample having a coercive voltage $V_c$ of about 10 volts.

(5) Switching transients exhibited characteristic double peaks for ferrielectrics near the coercive voltage $V_c$, and degenerate rapidly as the applied field drives the sample into saturation.

(6) The curie point of this material could not be determined electrically because it appears to be highly conductive above 600° C. However, using optical techniques, a Curie temperature of 620° within a 15° tolerance was found.

(7) Switching speeds of 0.5 $\mu$sec. can be obtained with only 30 volts switching voltage.

(8) Very high repetition rates, up into the megacycle region, are obtainable.

It is noted that the "layer-type mixed bismuth oxides" represent the second group of materials having a threshold switching field and ferrielectric properties. The only obstacle to industrial utilization of this material, with its excellent properties, was the fact that it exhibited very stable, but asymmetrically biased hysteresis loops.

It is the general object of this invention to provide electrical devices embodying this new biased ferrielectric substance.

Another object of this invention is to provide a ferrielectric material of the "mixed bismuth oxides with a layer-type structure" in which the symmetrical internal bias is practically eliminated by small additions of impurities or substitutions.

Another object of this invention is to utilize two or more ferrielectric dielectric sections in a device to achieve an overall symmetry of the hysteresis loop.

A further object of this invention is to produce multi-port control devices embodying a ferrielectric material of the "mixed bismuth oxides with a layer-type crystalline structure."

Again a further object of this invention is to produce a multi-condenser device embodying the ferrielectric substances of this invention.

Figure 2:
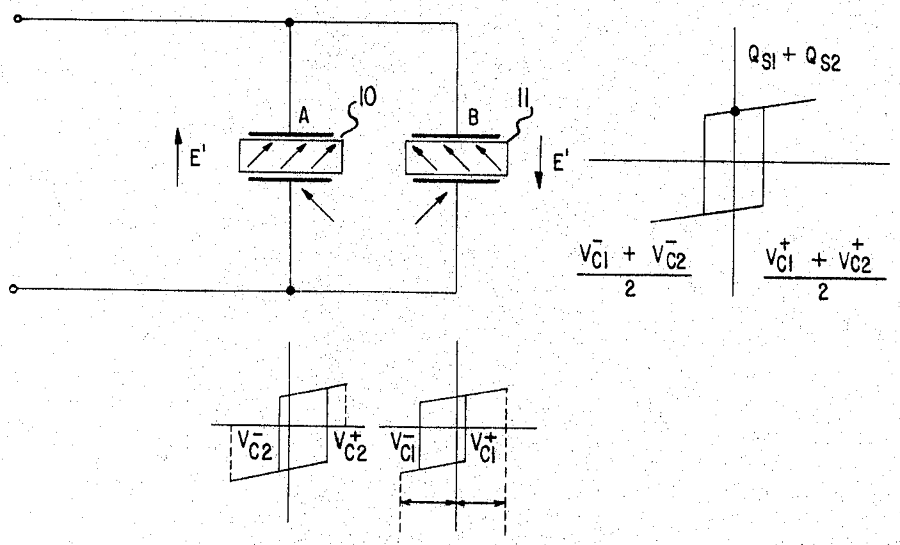
Figure 3:
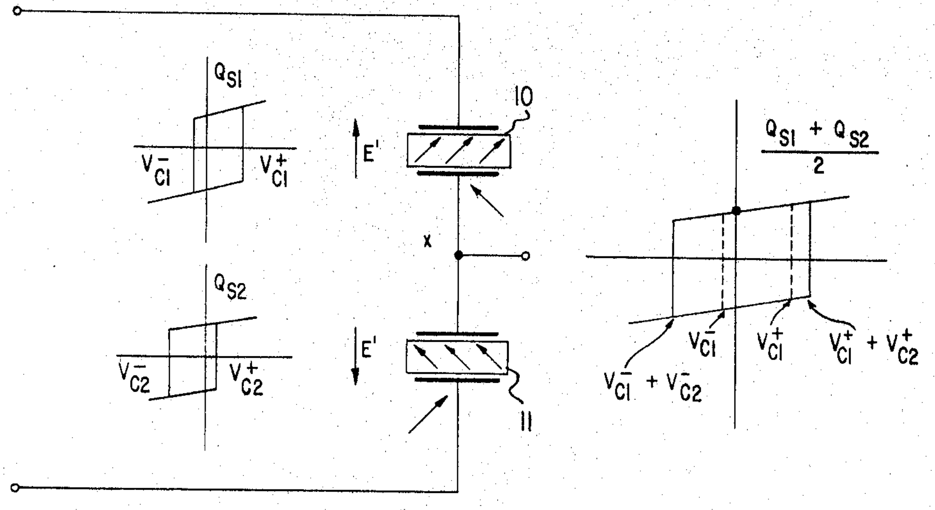
Figures 4A, 4B, 4C:
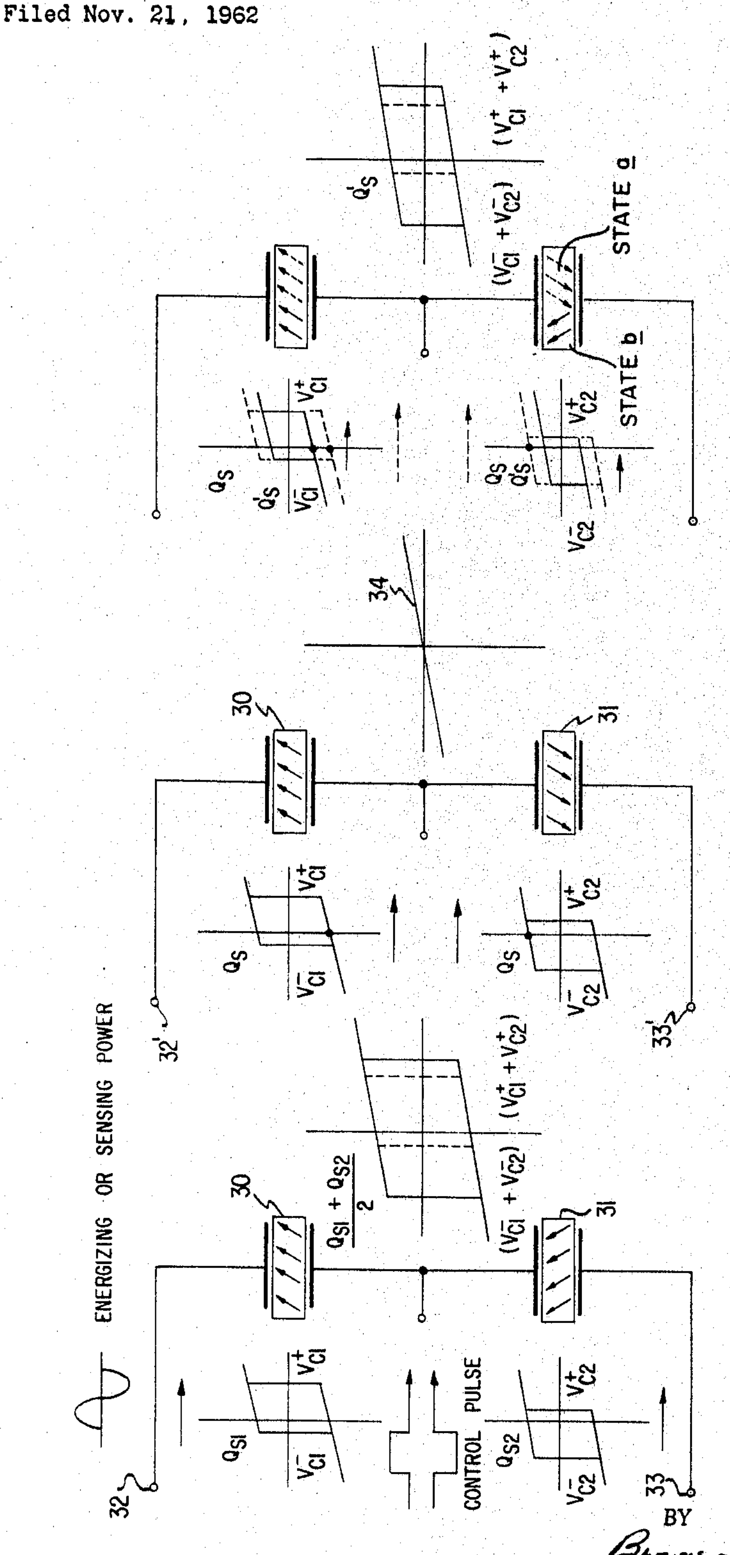
Figure 5:
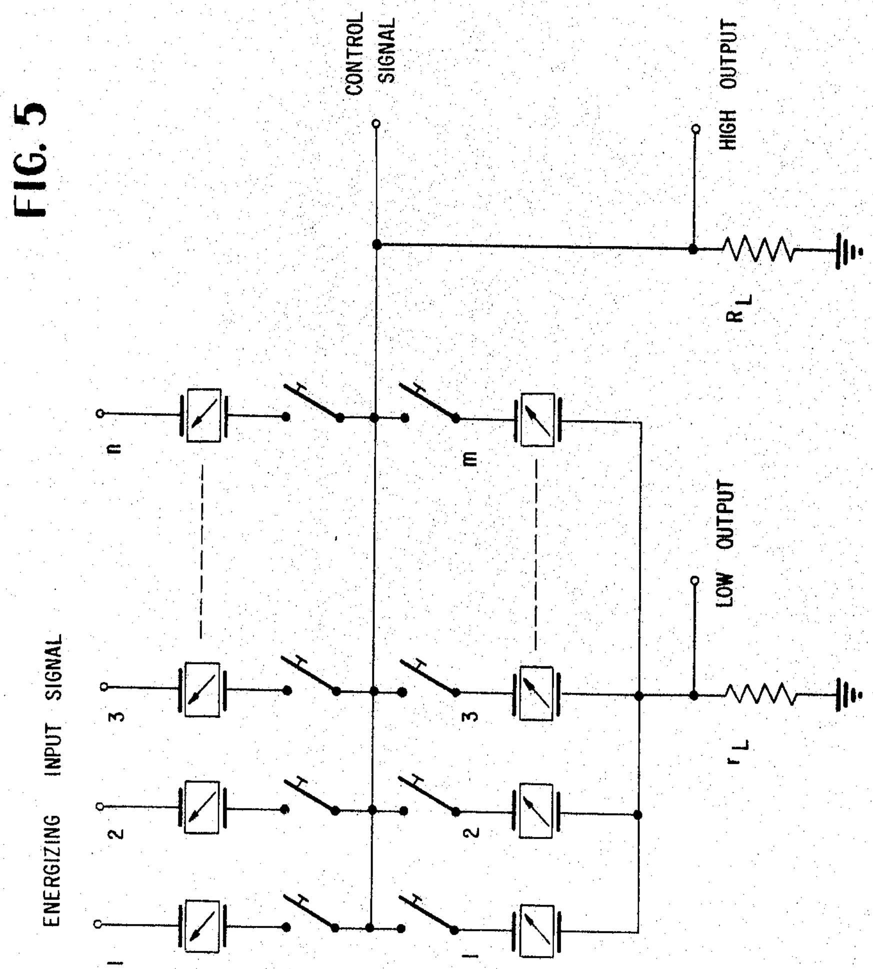

The foregoing will be better understood with reference to the following specification and accompanying drawings wherein:

FIGS. 1(*a*) through 1(*e*) are curves which illustrate internal and external bias effects in a ferrielectric substance;

FIG. 2 and FIG. 3 illustrate parallel and series connections respectively of ferrielectric, dielectric sections to achieve an overall symmetrical hysteresis loop;

FIGS. 4(*a*), 4(*b*) and 4(*c*), respectively, show (*a*) series connection for ferrielectric elements having identical polarization vectors, but connected so as to minimize or eliminate the internal bias of each, (*b*) identical but oppositely directed polarization vectors, and (*c*) a partial switching of the polarization vector of the individual ferrielectric sections; and FIG. 5 illustrates a multi-port device embodying principles of this invention.

Referring now to FIG. 1(*b*) (showing the virgin internally biased state with no external bias applied to the element), when a sufficient field is applied to the ferrielectric element for the composition, for example, $Bi_4Ti_3O_{12}$ (bismuth titanate), to ensure saturation, an asymmetrical hysteresis loop appears as shown. The coordinate system in the diagram is centered, such that the positive and negative halves of the applied field are equidistant from the origin. However, the body of the loop is displaced along the field axis in the negative direction. This is indicative of an asymmetrical internal bias, which may be neutralized by the application of a positive, external D-C field to the ferrielectric element. (In the drawings the external bias is indicated as $V_b$ with arrow indicating the direction and relative magnitude thereof.)

I found that a stable internal bias exists in the material which may be negative or positive depending on the domain orientation of the crystalline material. If a constant magnitude A-C field is applied to the element, then, as the magnitude of the external D-C field $V_b$ (opposite in sign to the internal field) is increased, the body of the loop shifts in the opposite direction of the internal bias. There is a value of the external field which causes complete symmetry of the loop, giving the appearance of a normal ferroelectric loop. This symmetrical loop is indicated in FIG. 1(*c*).

If the external field $V_b$ is increased further (in the positive direction), the loop can be again forced into an asymmetrical condition appearing as the mirror image of the virgin state loop with an asymmetrical bias. This condition is depicted in FIG. 1(*d*). Continued increase of the external bias $V_b$ adds to the asymmetry and reduce the polarization. A field of sufficient strength can completely close the loop, reducing the polarization to zero, as shown in FIG. 1(*e*).

A further point of interest is the fact that by adding a field of the same polarity as the internal bias, the loop gradually closes as a function of the applied bias. This condition can be extended until the polarization is forced to zero as indicated in FIG. 1(*a*). The blocked states are indicated in FIG. 1(*a*) and FIG. 1(*e*).

The existence of an internal stable bias in the ferrielectric material $Bi_4Ti_3O_{12}$ can be demonstrated and it was found that an external D-C field can neutralize the effect of this parameter of the material. According to this invention if two or more asymmetrically biased ferrielectric elements are properly oriented and electrically connected to one another, the inherent asymmetrical internal bias of the elements are symmetrized and as a result asymmetrical as well as controllable ferrielectric capacitor devices are obtained.

Consider the circuit configuration of FIG. 2 where the internal bias field of each element is indicated schematically by an arrow labeled E'. The ferrielectric element 10 having a positive internal bias field, requires a negative external field to cause symmetry in the hysteresis loop. If the internal bias of ferrielectric element 11 is equal in magnitude to that of 10, and if 11 is connected as in FIG. 2, the net effect is a completely symmetric hysteresis loop.

Thus, one of the underlying principles of this invention is that if asymmetrically biased ferrielectrics are properly oriented and electrically connected in parallel, they establish a net hysteresis loop which is symmetric in all respects.

When the same two capacitors considered above were connected in series as indicated in FIG. 3, it was observed that the effect is the same, i.e. the net hysteresis loop is symmetric in all respects.

The significant feature of the parallel case (FIG. 2) is that the net coercive field after neutralization is one-half the magnitude of the coercive fields of each element taken separately, while the net change (polarization) is the sum of the charge of each element e.g. $Q_{S1}+Q_{S2}$.

Quite different from this is the case where the elements are connected in series (FIG. 3). After neutralization, the total charge (polarization) is one-half the sum of the charge on each element taken separately. However, in this case, the total coercive field is the sum of the coercive fields of each element. For a schematic representation of these important features of series neutralization reference is made to FIG. 3.

There is one additional feature of the series configuration which should be noted. If a D-C field is applied to the center point between the two ferrielectric elements, the effect on the bias is the same in both elements, i.e. it either adds to or reduces the internal field; thus when elements are connected in series, so long as the magnitude of the internal field of both is the same, complete hysteresis loop symmetry remains. However, in addition to the facts described in connection with a single element, the net polarization will change as a function of the field applied to the center point X, and will depend on the state of polarization in the series sections of the ferrielectric elements.

The recently developed charge transfer device, i.e. the "Transpolarizer" (I. Pulvari, C. F., Air Force W.A.D.C. Technical Report No. 58–657 "Research on Barium Titanate and Other Ferrielectric Materials for Use as Information Storage Media," Contract AF33(616)–2934, ASTIA Document No. AD209530; Anderson, J. R., "Ferroelectric Storage Device," U.S. Patent 2,695,393, patented 23rd November, 1954), analogous to its magnetic counterpart, the transfluxor (Rajchman, J. A., and Lo, A. W., "Two Transfluxor—a Magnetic Gate with Stored Variable Setting," RCA Review, vol. XVI (June 1955), consists of at least two capacitors with a preferable crystalline ferroelectric dielectric and a nearly rectangular hysteresis loop. This device was earlier disclosed in a paper (II. Pulvari, C. F., "The Transpolarizer: An Electrostatically Controlled Circuit Impedance With Stored Setting," Proceedings of the IRE, vol. 47, No. 6, June 1959) and essentially used ordinary ferroelectrics with symmetrical hysteresis loops and no threshold switching field. Control of polarization transfer through two or more ferroelectric dielectric sections in series represents a new basic means for storing and gating electrical signals and, in general, a means for controlling circuit impedance in any predetermined manner according to a stored setting.

The "impedance" of a circuit at a given frequency can be set to any predetermined level by a single pulse and it will remain for a long period of time. Transmission of A.C. power can, therefore, be controlled or set to a desired level by a single setting pulse. This level may assume any value between zero and the maximum limits of the device and perform either an "on-off" or "continuous" stored control.

The practical use of ordinary ferroelectrics until now was limited because of fatigue effects and lack of a sharp threshold field. With the invention here disclosed, these problems have been resolved because these new ferrielectric materials, having ferroelectric properties, possess a threshold switching field. The basic element in all of these devices is a condenser with a dielectric exhibiting ferrielectric properties. When two or more ferrielectric capacitors are in a common path or paths and polarization of the condensers can be individually controlled, interesting new switching and storing functions can be achieved.

The "Transpolarizer" (Pulvari Supra II) or charge transfer device can be regarded as a capacitor with a dielectric of variable dielectric constant to permit any setting of impedance in a continuous way between the blocked and the unblocked states with a single setting pulse or bias, depending on circuit requirements. Any state, once set, will maintain its non-linear "impedance" until another state is set. The "transpolarizer" is a voltage device with a short setting time and, when energized by an A.C. voltage, the current through it will correspond to its set impedance level. When operated in its blocked or unblocked states it represents a storage element with "non-destructive" read-out which permits construction of storage devices with permanent memory.

According to this invention, the dielectric in a "Transpolarizer" is a material which exhibits ferroelectric properties, however, possessing a threshold switching field and are specified as ferrielectrics, such as for example, mixed bismuth oxides, as described. It is also important that "Transpolarizers" having dielectric sections individually exhibiting asymmetrically biased hysteresis loops, will, combined as a "Transpolarizer" device, exhibit completely symmetrical hysteresis loops and control operation.

If two ferrielectric elements, having either symmetric or asymmetric internal bias, are connected in series and if the polarization vectors of both elements are identical, as shown in FIG. 4(*a*), the two series-connected elements exhibit electrical behavior identical to a single ferroelectric element.

The slanted polarization vectors shown in FIGS. 4 (*a*, *b*, *c*), symbolize asymmetrically biased ferrielectrics. For a negative internal bias they are tilted toward the left, while for a positive internal bias they are tilted toward the right. If both elements have identical properties, a low-frequency hysteresis loop will be observed which has a coercive voltage of $$V_{c2}^{+}+V_{c1}^{+}$$

and a total switched charge of $Q_s$.

If the polarization vectors of the two elements 30 and 31 are in opposite directions, as shown in FIG. 4(*b*), the (two-port or four-terminal) device has strikingly different electrical properties from that of a single ferroelectric element. When a positive voltage—say a step function of finite rise time—is applied between the two external terminals 32 and 33, no wet switching of charge results and the device resembles a normal linear dielectric capacitor. This can be explained with the aid of the low-frequency hysteresis loops of FIG. 4(*b*). As the applied voltage rises, it is at first equally divided between both elements. At a certain value of applied voltage, the upper element 30 starts to switch, i.e., the instantaneous value of charge starts to move around the lower knee of the hysteresis loop. At this point, the dielectric constant increases and therefore the capacitance of the upper element 30 takes on a large value. Consequently, the applied voltage is no longer equally distributed across both elements but is divided in inverse proportion to their capacitances.

As applied voltage increases, the voltage across the lower element 31 increases and the instantaneous value of charge moves in the saturation region of the hysteresis loop. For this reason, the upper element 30 cannot be switched and the voltage on it remains constant at a value slightly less than its coercive voltage. Thus, no switching results. If the polarity of applied voltage is reversed, the role of upper and lower element interchanges. Since no switching takes place, a straight line 34 (FIG. 4(*b*)) which is characteristic of linear capacitors, will be observed in place of the normal hysteresis loop.

If no switching occurs the two elements 30 and 31 are said to be in a "blocked" condition; if switching can take place, the two elements 30 and 31 are said to be "unblocked."

FIG. 4(*c*) shows a partially blocked state. This is obtained when the polarization of one of the capacitors is partially switched from state *a* into state *b*, and thereby leaving part of the polarization vectors in both elements identical. As a consequence, part of the polarization behaves blocked as indicated by the dotted arrows and only that part of the polarization contributes to the loop which is unblocked and can be freely switched. Coercive voltage will again be $$V_{c2}^{+}+V_{c1}^{+}$$

but the switched charge Q's is less than $Q_s$ in the completely unblocked state. It is clear that the partially blocked state (FIG. 4(*c*)) represents a lower capacitance than the unblocked state (FIG. 4(*a*)) and that any level of partial blocking can be obtained depending on the control signal applied as indicated in FIGS. 1(*a, c, d, e*) which can be a single pulse or a D.C. bias depending on whether a static or dynamic operation is required.

A most interesting feature of the device is that it be changed from a capacitor having erroelectric properties into a linear capacitor and can assume any intermediate polarization level between these two limits and, in addition, because the dielectric sections are ferrielectric, a threshold switching field exists for each setting; furthermore, it is capable of controlling a flow of A.C. electric power according to its setting.

The unique high input impedance ($10^{10}$ ohms) properties of the "Transpolarizer" open up a large field of new applications such as amplifiers for high impedance devices, condenser microphones, photoelectric cells, visual indicating devices, visual pick-up devices, storage devices with non-destructive read-out decoders, function generators, electrical nerve cells, etc. This device is rugged and almost non-destructible. It stands heat up to 300° C. Voltage rating is ten times the coercive voltage. Breakdown voltage is higher than 25 times the coercive voltage, and units with coercive voltages from 15 volts up to 50 volts are readily available. Control power is extremely small. Switching times of 0.5 $\mu$ sec. are obtainable. Repitition rates are from D.C. to 1 mc. Similar to ferrite cores, this device possesses a true switching threshold field.

It is noted that multisection devices using the principle of compensating asymmetrically biased ferrielectrics can be prepared on a single slab of ferrielectrics such as doped mixed bismuth oxides as described and interconnected according to the principles outlined in this disclosure.

It is also noted that the matrices of the type disclosed and shown in a McGraw-Hill Publication in the Computor's Handbook of Husky & Corn can also be formed utilizing the multisection internal bias compensation principle and these matrices can also be formed on a single slab of crystal, as shown for example in my application Ser. No. 14,585.

FIG. 5 exemplifies a multiport input transpolarizer with two outputs. For simplicity's sake, it is assumed that each capacitor has identical dimensions and a ferrielectric dielectric with a threshold switching field. There are $n+m$ capacitors, one electrode of each can be connected to a control terminal as required. It is noted that both sets of capacitors can be prepared on a slab of ferrielectric crystal.

The upper capacitors have 1, 2, 3, . . . *n*, energizing leads, while the lower 1, 2, 3, . . . *m* capacitors connect through a low load resistor $r_L$ to ground from which one set of output pulses can be derived. The control terminal connects through a high load resistor $R_L$ to ground and to a control lead. A number of varieties of operations are possible with this multisection device. The individual capacitors can be set by proper coincidence of identical or opposite polarity energizing and/or control pulses and the number of upper or lower capacitors connected to the control buss. According to the operative principles described earlier, whenever two polarization vectors of a pair of capacitors indicate in the same direction, they can be switched and produce on the "low output" $r_L$ a signal while capacitor pairs with opposite polarizations vectors do not switch. However, the pertinent upper capacitor can be switched through $R_L$ and an output appears on the "high output" at the top of $R_L$.

It is also apparent that if the number of upper capacitors (*n*) connected to the control buss are larger than the number of lower capacitors (*m*) and the polarization vectors point in the same direction, and the multilead input leads are energized in a sequence or randomly in time, *m* pulses will appear on the low output $r_L$ and $n-m$ pulses will appear on the high output $R_L$.

Such a device can be used as an electrical nerve cell, because it possesses a threshold switching field and a multiport input resulting in a number of predetermined outputs; another application of this device is to use it as a counter or dividing circuit. Again another application may be the use as an *and* gate etc.

This is but one of the many possible multicondenser and multiport arrangements feasible, using the principle of controlled transfer of polarization through multisection capacitors having ferrielectric dielectrics with a threshold switching field as a result of the existence of a stable internal bias field in the dielectric.

According to another approach to the same general subject of the invention; to produce electrical devices embodying ferrielectric substances which do not exhibit asymmetrical biased hysteresis loops, I found that small additions of impurities or substitutions modify the dipole pattern of the originally asymmetrically biased mixed bismuth oxide having a layered structure so that the asymmetrical internal bias is practically eliminated, while the threshold switching field, which is a most important feature of the newly discovered ferrielectrics, is retained. Thus, if the internal bias is practically eliminated at least substantially reduced, the use of an asymmetrically biased mixed bismuth oxide having a layered structure to which small impurity additions have been made, e.g., a doped ferrielectric substance, in conjunction with the application of an external voltage to overcome the weakened internal bias resulting from the doping (impurity addition) provides a symmetrical internally biased ferrielectric substance which exhibits a truly symmetrical hysteresis loop.

As an example of such small impurity additions to the basic and simplest mixed bismuth oxide composed of:

$$2Bi_2O_3+3TiO_2\rightarrow Bi4Ti_3O_{12}$$

Zirconium addition between 0 to 0.25 mole percent is nearly perfectly compensating, i.e., symmetrizing the asymmetrical internal bias, while the threshold switching field is retained. Similar effects can be achieved by a special addition of the other impurities, such as lanthanum and yttrium, which modify the original layered bismuth oxides so as to eliminate the internal bias.

In addition to the already mentioned $Bi_4Ti_3O_{12}$ structure, it is possible to synthetize a large family of "mixed bismuth oxides with layered structure" which may be equally well utilized as a basic material for this invention.

Technical articles describing these oxides are:

"Mixed Bismuth Oxides With Layer Lattices," II. Structure of $Bi_4Ti_3O_{12}$ by Bengt Aurivillius, Arkiv for Kemi Band 1 nr 58 15 September 1949.

"Mixed Bismuth Oxides With Layer Lattices. I. The structure type of $CaNb_2Bi_2O_9$," by Bengt Aurivillius, Arkiv for Kemi Bank 1 nr 54, 15 September 1949.

"The Structure of $Bi_2NbO_5F$ and Isomorphous Compounds," by Bengt Aurivillius, Arkiv for Kemi Band 5 nr 4, 14 May 1952.

"Mixed Oxides With Layer Lattices. III. Structure of $BaBi_4Ti_4O_{15}$" by Bengt Aurivillius, Arkiv for Kemi Band 2 nr 37, 24 May 1950.

"Some Properties of Bismuth Perovskites," MIT Technical Report 160, March 1961.

"Crystal Chemistry of Mixed Bismuth Oxides With Layer-Type Structure," E. C. Subbarao, Am. Ceramic Soc., April 1962.

Generalized formulas for the various type of interlaced layered structures are presented in the six quoted publications. As an example, for a family of mixed bismuth oxides the following general formula is presented:

$$(Me_2O_2)^{2+}(Me_{m-1}R_mO_{3m+1})^{2-}$$

Me=ions of appropriate size and valency.
R=$Ti^{4+}$, $Nb^{5+}$, $Ta^{5+}$, etc., either singly or in combination.
*m*=2, 3, 4, etc.
One member of this family, for example, is $PbBi_2Nb_2O_9$.

In preparing an electrical device, e.g., a condenser or capacitor having as the dielectric thereof a ferrielectric material according to the present invention, the material is heated beyond its Curie temperature in order to effect uniform domain conversion of the ferrielectric material and thus eliminate crooked hysteresis loops. Electrodes may be applied to the crystalline ferrielectric material by suitable techniques known to those skilled in the art, such as evaporation techniques or fired on conductive pastes, etc. When heating the material above its Curie temperature a polarizing voltage is applied to the material, which voltage is maintained while the material is cooling down. When conductive paste electrodes are fired in the process of applying them to the ferrielectric material, they can be utilized to apply the polarizing field, through the application of a suitable voltage, either while the ferrielectric material is heated beyond the Curie point or while the heating has been discontinued and the crystalline material is being permitted to cool down. Such a polarizing field or voltage is maintained a sufficient time to provide the required transition field (or voltage) required to reverse the polarization of that part of the ferrielectric material requiring such reversal of polarization in order to provide a ferrielectric material having the proper initial over-all polarization and which exhibits the asymmetrical biased hysteresis loops described above.

The invention has been described above in several specific embodiments and, since modifications and equivalents will be apparent to those skilled in the art, the description is intended to be illustrative of, and not a limitation upon, the scope of the invention.

I claim:

1. A ferrielectric body being essentially a degenerate antipolarized material having means modifying the free energy of the antipolarized state, said means including the addition of selected substitutions of impurity additions to constitute a layered crystalline dielectric material structure in which a stable ferrielectric phase can be induced and the antipolarized and ferroelectric state coexist and exhibit hysteresis loops which resembled polarized hysteresis loops but are in fact degenerate antipolarized hysteresis loops and exhibits a threshold switching field below which polarization reversal can not be effected and beyond which polarization can be reversed.

2. The ferrielectric body defined in claim 1 wherein said impurity substitutions include one or more elements selected from the group of zirconium, lanthanum, and yttrium.

3. The ferrielectric body defined in claim 1 wherein said selected impurity substitution consists essentially of zirconium addition between 0 to 0.25 mol percent.

4. A ferrielectric body as described in claim 1 in which the polarization can be reversed, said body comprising mixed bismuth oxides.

5. A ferrielectric body in which the onset of the ferroelectric state is a function of applied field and compositions, said body being a dielectric material comprising at least two compositions in a solid solution with each other and said solid solution being composed of sublattices of which at least two are of an interlaced layered structure.

6. A ferrielectric body having ferroelectric properties, said body comprising single crystal material composed of a layered structure, said layers being located alternately one on the other and exhibiting a threshold switching field so that the onset of ferroelectric state occurs only above a selected applied field.

7. A ferrielectric body of the layered-type mixed bismuth oxides being in its virgin state, antiferroelectric in which one set of layers consist of an $ABO_3$ perovskite structure, where A is selected from the group bismuth, yttrium, lanthanum, and B is a member selected from the group of titanium, zirconium, hafnium.

8. A ferrielectric body having ferroelectric properties, said body comprising a plurality of layers consisting of bismuth oxide layers and bismuth titanate layers resulting in a material exhibiting a threshold switching field.

9. A ferrielectric body having ferroelectric properties and a threshold switching field, said body comprising a plurality of bismuth oxide layers and bismuth titanate layers being modified by selected substitutions or impurities selected from the group zirconium, lanthanum, and yttrium, and resulting in a substantially symmetrical internal biased material having a threshold switching field.

10. An electric device comprising at least two conducting electrodes spaced by a ferrielectric body of the layered type mixed bismuth oxides exhibiting a threshold switching field and ferroelectric properties.

11. An electric device comprising at least two conducting electrodes spaced by a ferrielectric body made up of crystals composed of the layered type mixed bismuth oxides, said ferrielectric body possessing a threshold switching field and ferroelectric properties.

12. An electric device composed of at least two conducting electrodes spaced by a ferrielectric body of the layered type mixed bismuth oxides modified by a proper choice of substitutions of impurities such as zirconium, lanthanum, and yttrium, and resulting in a practically symmetric internally biased material having a threshold switching field.

13. An electric device comprising at least two conducting electrodes spaced by a ferrielectric body consisting essentially of a plurality of bismuth oxide layers and bismuth titanate layers resulting in a device exhibiting a threshold switching field and ferroelectric properties.

14. An electrical device comprising at least two conducting electrodes spaced by a ferrielectric body composed of a plurality of interlaced layers consisting of bismuth oxide layers and bismuth titanate layers in a single crystal structure resulting in a material exhibiting a threshold switching field and an asymmetric internal bias and ferroelectric properties.

15. An electric device according to claim 14 wherein each of said electrodes is an adherent, metallic coating on said ferrielectric body.

16. An electric device comprising at least three or more internally biased electrodes and at least two or more ferrielectric, dielectrics, in series connection and having an over-all symmetry of the hysteresis loop.

17. An electric device comprising at least three or more conducting electrodes spaced by ferrielectric, dielectric sections in which each section individually exhibits an asymmetric hysteresis loop and an asymmetrically biased hysteresis loop, while the multisection device as a unit exhibits an overall symmetry of the hysteresis loop.

18. An electric device comprising at least three conducting electrodes spaced by internally biased ferrielectric, dielectric sections where the two ferrielectric, dielectric sections with electrodes are in parallel to achieve an overall symmetry of the hysteresis loop by connecting in parallel the two dielectric sections in a proper orientation so that the symmetric, internal biases of the ferrielectric sections are opposite.

19. A multisection device comprising compensatingly biased ferrielectric on a single slab of ferrielectric material wherein said slab is a doped mixed bismuth oxide.

20. A switching matrix comprising a plurality of asymmetrically biased ferrielectric double sections formed on a single slab crystal.

21. A capacitor device comprising a body of internally biased ferrielectric material electrode means operatively associated with said body of material and means for modifying the internal bias characteristic of said body of ferrielectric material.

22. A capacitor device as defined in claim 21 wherein said means for modifying the internal bias characteristic of said ferrielectric body consists essentially of impurity additions from the group including zirconium, lanthanum and yttrium.

23. A capacitor device as defined in claim 20 wherein said internal bias modifying means comprises a second ferrielectric capacitor device having complementary internal bias characteristics electrically connected to the first said device.

24. A capacitor device as defined in claim 23 wherein said second ferrielectric capacitor device is connected in electrical parallel with the first mentioned capacitor device.

25. A capacitor device as defined in claim 23 wherein said second device is connected in electrical series with the first mentioned capacitor device.

26. A capacitor device as defined in claim 25 wherein an end of the series connected devices forms an input terminal and a point intermediate the two devices forms an output terminal.

27. A capacitor device as defined in claim 25 wherein one end of the series connected devices forms an input terminal for an energizing input signal, a point intermediate the two devices forms a control signal input terminal and a load impedance is connected in series with said series connected devices and at the other end thereof.

28. A control device comprising a pair of ferrielectric sections having complementary internal bias characteristics, electrode means between which said ferrielectric sections are placed so that said ferrielectric sections are electrically in series circuit, means for applying a control signal voltage to an intermediate point between said series connected sections, and means connecting said series circuit to a source of energizing voltage.

29. Control apparatus comprising a pair of serially connected bistable polarizable ferrielectric capacitors of opposite internal bias characteristics type, a source of energizing potential connected to said serially connected capacitors, bias means connected to a point intermediate said capacitors for shifting the polarization of at least one of said capacitors, and a load impedance connected to a point in said series circuit across which an output voltage is developed on shifting of polarization state of one of said capacitors.

References Cited

UNITED STATES PATENTS 2,691,738 10/1954 Matthias ---------- 340—173.2

OTHER REFERENCES

"Ferrielectricity," Chas. F. Pulvari, The Physical Review, vol. 120, No. 5, pp. 1670–1673, Dec. 1, 1960.

"Ferrielectric Behavior of Thiourea," Goldsmith et al., Journal of Chemical Physics, vol. 31, November 1959, pp. 1175–1187.

TERRELL W. FEARS, Primary Examiner

U.S. Cl. X.R.

29—155.5; 252—69.2; 340—173.2